United States Patent Office 3,315,010
Patented Apr. 18, 1967

3,315,010
MIXTURE OF AN EPOXY RESIN AND AN O-TOLUIDINE-ALDEHYDE CONDENSATE
David E. Graham, Westfield, N.J., assignor to General Aniline & Film Corporation, New York, N.Y., a corporation of Delaware
No Drawing. Filed May 23, 1962, Ser. No. 196,873
4 Claims. (Cl. 260—834)

This invention relates to novel hardening agents for epoxy resins, a method for their production, and their use in preparing epoxy resin products having improved properties. More particularly, the invention relates to novel condensation products of aromatic amines and aldehydes which further react with epoxy resins to yield products having a high strength and heat distortion stability.

Epoxide resins are substances of high molecular weight and are condensation products obtained by reacting a polyepoxide or complex epoxide, containing at least two epoxy groups, with a hardening agent capable of condensing with the polyepoxide or complex epoxide to form hard, insoluble resins which are useful for the production of protective coatings, films, molding compositions, adhesives, and the like.

The epoxy resins and their polyepoxide intermediates are well known materials which can be made by a variety of processes. One group of polyepoxides is obtained by the reaction of two or more moles of a di-epoxide with one mole of a tri-hydric phenol. Another group of materials is obtained by reacting polyfunctional phenols with polyhalohydrins. These materials do not constitute a part of the present invention.

The polyepoxides, produced as described above, are condensed with any of the well known hardening agents to produce the resins. For this condensation it is necessary to use a catalyst which may be an alkaline substance, such as an amine, sodium or potassium hydroxide, or alkali phenoxides, or it may be a Friedel-Crafts type catalyst, such as boron trifluoride.

It has been proposed to use certain aromatic amine-aldehyde condensation products as hardening agents for epoxy resins. These condensation products are produced, for example, by reacting aniline with formaldehyde in the presence of minor amounts of an acidic catalyst, such as about 0.04 part by weight of formic acid. While these aromatic amine-aldehyde resins will react with polyepoxides in the presence of the usual alkaline catalysts to produce epoxy resins capable of forming coatings, films, or molding compositions, the resulting epoxy resins suffer from the disadvantage that they are excessively brittle and have rather low heat distortion temperatures when fabricated into molded articles.

It has also been proposed to use as hardening agents for epoxy resins products obtained by condensing meta-chloraniline with formaldehyde in molar ratios of 1:0.5 to 1:0.9 and in the presence of a strong aqueous acid solution. It has further been proposed to use as hardening agents for epoxy resins condensation products of meta-phenylenediamine and di- lower alkyl ketones, e.g., acetone, methylethylketone, and methyl-isobutylketone which are obtained by condensing in the presence of small amounts of a strong acid catalyst a ketone of the above type with meta-phenylenediamine in molar ratios of at least 1 mole of ketone per mole of m-phenylenediamine. The use of the above hardening agents resulted in somewhat harder and stronger products than heretofore obtained.

An object of this invention is to provide a novel hardening agent for epoxy resins, the use of which makes for improved products. Another object is to provide such a novel hardening agent which, when reacted with any of the well-known polyepoxides, will yield a resin having high resistance to heat distortion. A further object is to provide such a hardening agent which will produce a resin having low brittleness and high mechanical strength. Still another object is to provide a hardening agent which is capable of reacting with a polyepoxide without the necessity of using the usual alkaline catalysts. Other objects and advantages will be apparent from the following description of the invention.

In general, in accordance with the present invention, it has been unexpectedly found that, when an aromatic amine is condensed with an aldehyde in the presence of an excess of acid, there is obtained a condensation product which, in any of its stages of condensation, is capable of reacting with a polyepoxide to produce a cured resin having high mechanical strength and high resistance to distortion by heat.

More specifically, the instant invention comprises reacting o-toluidine with formaldehyde and using the resulting condensation product as a hardening agent for epoxy resins by reacting the said condensation product with a polyepoxide.

In a preferred form, the instant invention comprises the condensation of o-toluidine with formaldehyde, preferably in the presence of a large excess of a strong mineral acid, such as, for example, hydrochloric acid. Optimum results are obtained when the number of moles of acid is equal to or greater than the combined total number of moles of amine and aldehyde.

The following examples are illustrative of the present invention. However, it will be apparent to those skilled in the art that other aromatic amines, other aldehydes, and other polyepoxides can be used in place of the specific materials used for illustration purposes.

EXAMPLE 1

*Preparation of aromatic amine aldehyde condensation product*

Into a 12-liter flask fitted with a thermometer and reflux condenser and provided with a heating mantle, there were charged 6000 ml. of 6 N hydrochloric acid (36 moles) and 1,900 grams of o-toluidine (17.8 moles).

To this mixture was added, over a period of a half hour, 1,320 grams of 40% formaldehyde solution (17.6 moles), a temperature of 40–75° C. being maintained during the addition of the formaldehyde. The temperature of the contents of the flask was then raised to 95–97° C. and maintained at this level for 24 hours. At the end of 24 hours the reaction was stopped by pouring the contents of the flask into a solution of 3000 grams of 50% sodium hydroxide (37.5 moles) in 6,000 ml. of water to neutralize the hydrochloric acid.

The resulting mixture was steam-distilled to remove any unreacted o-toluidine and the aqueous layer siphoned off. The residue was then washed with hot water until the supernantant liquid no longer gave a positive base test with phenolphthalein. At this point the resin was heated to 150° C. under vacuum to remove the water and then poured while hot into pans and allowed to set.

A yield of 1,962 grams (90% of theory) was recovered. Analysis showed 11.6% N (calculated: 11.8%, based on $(C_8H_9N-)_n$).

The molecular weight of the product, determined by the freezing point depression of nitrobenzene, was found to be 518.

EXAMPLE 2

*Preparation of epoxy resin castings*

Into 3 aluminum cups, each containing 9.25 grams of Shell Chemical Company Epon–828, were added, respectively, 3, 4 and 5 grams of the o-toluidine formaldehyde resin obtained in Example 1. The mixtures were each warmed and stirred until homogeneous, then cured for 2 hours at 85° C., and finally for 6 hours at 180° C.

When cooled, the castings were each quite hard, but not brittle. To test for brittleness, a 100-gram weight was dropped on the castings from a height of one foot. None broke.

EXAMPLE 3

*Preparation of epoxy resin bar castings*

Bar castings were prepared by adding the o-toluidine-formaldehyde resin obtained in Example 1, to varying amounts of Shell Chemical Company Epon–828. One series was cured overnight at 85° C., and then for 6 hours longer at 150° C. Table 1, below, gives the proportions of the mixtures used and the heat distortion temperature of the cured resin.

| Bar No. | Grams of Agent per 27 grams of Epon-828 | Heat Distortion Temperature, °C. |
|---|---|---|
| 1 | 7.45 | 96 |
| 2 | 8.94 | 127 |
| 3 | 10.42 | 178 |
| 4 | 11.90 | 172 |

EXAMPLE 4

Another series of bar castings was made. These were cured at 85° C. for 2 hours, then for 6 hours at 180° C.

Table 2, below, gives the compositions and heat temperatures of the castings.

| Bar No. | Grams of Agent per 27 grams of Epon-828 | Heat Distortion Temperature, °C. |
|---|---|---|
| 5 | 10.4 | 184 |
| 6 | 11.9 | 177 |
| 7 | 10.4 | 184 |
| 8 | 11.9 | 188 |
| 9 | 10.4 | 194 |
| 10 | 11.9 | 185 |

While the invention has been illustrated by the condensation of o-toluidine with formaldehyde, it is obviously not limited thereto. Thus, one can replace o-toluidine with any of its isomers or homologues, or anilines substituted in a plurality of ring positions, as well as condensed-ring aromatic amines, such as α-naphthylamine, and the like. Similarly, for formaldehyde, there can be substituted higher homologous aldehydes and any of the usual cyclic aldehydes, such as furfuraldehyde, and the like.

Having described the invention, what is claimed as new is:

1. A composition consisting essentially of a hardened mixture of an epoxy resin comprising a polyglycidyl ether of a polyol and a condensation product of substantially equi-molar amounts of o-toluidine and formaldehyde condensed in the presence of an acid in an amount at least equal to the combined mols of o-toluidine and formaldehyde.

2. The composition of claim 1 wherein said acid is hydrochloric acid.

3. An epoxy resin consisting essentially of the reaction product of a polyepoxide comprising a polyglycidyl ether of a polyol and a condensation product of substantially equi-molar amounts of o-toluidine and formaldehyde condensed in the presence of an acid in an amount at least equal to the combined mols of o-toluidine and formaldehyde.

4. The epoxy resin of claim 3 wherein said acid is hydrochloric acid.

References Cited by the Examiner

UNITED STATES PATENTS

| | | | |
|---|---|---|---|
| 2,494,295 | 1/1950 | Greenlee | 260—834 |
| 2,511,913 | 6/1950 | Greenlee | 260—72 |
| 2,769,797 | 11/1956 | Suen et al. | 260—834 |
| 2,834,756 | 5/1958 | Suen et al. | 260—72 |
| 2,892,811 | 6/1959 | Irany | 260—72 |
| 2,978,437 | 4/1961 | Christenson | 260—72 |
| 3,026,285 | 3/1962 | Hirosawa et al. | 260—834 |
| 3,071,559 | 1/1963 | Smith | 260—834 |
| 3,207,813 | 9/1965 | Harvey | 260—834 |

OTHER REFERENCES

J.A.C.S. 73, 1715–17 (1951).

J. Chem. Soc. Japan, Pure Chem. Sec. 72, 224–7 (1951).

Zhur Obshchei Khim 27, 775–80 (1951).

MURRAY TILLMAN, *Primary Examiner.*

LOUISE P. QUAST, *Examiner.*

A. L. LIEBERMAN, P. LIEBERMAN,
*Assistant Examiners.*